US011146029B1

(12) United States Patent
Shaffer et al.

(10) Patent No.: US 11,146,029 B1
(45) Date of Patent: Oct. 12, 2021

(54) PLUG HOLDER FOR INSTALLING PLUG END

(71) Applicant: Brunswick Corporation, Mettawa, IL (US)

(72) Inventors: Benjamin C. Shaffer, Bedford, NH (US); Gerald J. Demirjian, Auburn, NH (US); Brian R. D'Amelio, Auburn, NH (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 16/913,098

(22) Filed: Jun. 26, 2020

(51) Int. Cl.
*H01R 13/502* (2006.01)
*H01R 13/74* (2006.01)
*H01R 13/52* (2006.01)
*H01R 13/516* (2006.01)

(52) U.S. Cl.
CPC ......... *H01R 13/748* (2013.01); *H01R 13/502* (2013.01); *H01R 13/516* (2013.01); *H01R 13/5213* (2013.01); *H01R 2201/26* (2013.01)

(58) Field of Classification Search
CPC .. H01R 13/748; H01R 13/502; H01R 13/516; H01R 13/5213; H01R 2201/26
See application file for complete search history.

(56) References Cited

U.S. PATENT DOCUMENTS

| 6,234,823 | B1 * | 5/2001 | Fuess | H01R 13/5816 439/346 |
| 6,454,576 | B1 * | 9/2002 | Hedrick | H01R 13/5812 439/105 |
| 6,878,007 | B1 * | 4/2005 | Decker | H01R 13/625 248/328 |
| 7,572,065 | B2 * | 8/2009 | Lu | G02B 6/3894 385/78 |
| 10,723,419 | B1 * | 7/2020 | Jordan | H02J 1/08 |
| D893,431 | S * | 8/2020 | Nook | D13/137.4 |
| 2002/0100652 | A1 | 8/2002 | Loyd | |
| 2004/0038588 | A1 * | 2/2004 | Bernardi | G02B 6/3893 439/587 |

(Continued)

OTHER PUBLICATIONS

ProMariner. "Power Mania AC Plug Port". Accessed from http://www.powermaniausa.com/accessory.html on Mar. 5, 2020.

(Continued)

*Primary Examiner* — Truc T Nguyen
(74) *Attorney, Agent, or Firm* — Andrus Intellectual Property Law, LLP

(57) ABSTRACT

A plug holder for installing a male plug end of a marine battery charger on a marine vessel includes an outer housing, a removable sleeve, and a backstop. The outer housing has a front end defining a plug opening and a back end defining a back opening, wherein the outer housing is attachable to a vessel hull and configured to hold a male plug end of the marine battery charger within the outer housing such that it is accessible through the plug opening. The removable sleeve fits within the outer housing and is shaped to secure the male plug end within such that it does not move when connecting or disconnecting thereto. The backstop is removably connectable to the back end of the outer housing to cover the back opening. The backstop is configured to retain the removable sleeve and the male plug end within the outer housing.

20 Claims, 7 Drawing Sheets

(56) References Cited

U.S. PATENT DOCUMENTS

| | | | | | |
|---|---|---|---|---|---|
| 2005/0014408 | A1* | 1/2005 | Swiatek | ............... | H01R 31/06 |
| | | | | | 439/215 |
| 2009/0160427 | A1* | 6/2009 | Drake | ............. | G01R 19/16566 |
| | | | | | 324/72 |
| 2011/0163711 | A1* | 7/2011 | Kiss | ................ | H01M 10/46 |
| | | | | | 320/101 |
| 2015/0087187 | A1* | 3/2015 | Kifedjian | ........... | H01R 13/6658 |
| | | | | | 439/620.22 |
| 2015/0097066 | A1* | 4/2015 | Knudsen | ............... | H02G 11/02 |
| | | | | | 242/400 |
| 2017/0288335 | A1* | 10/2017 | Hsu | ................ | G02B 6/3825 |
| 2019/0006793 | A1* | 1/2019 | Watkins, Jr. | ........ | H01R 13/6395 |
| 2019/0202302 | A1* | 7/2019 | Turik | ................ | B60L 53/14 |
| 2020/0130566 | A1* | 4/2020 | Albritton | ............ | H01R 13/703 |

OTHER PUBLICATIONS

ProMariner. "ProMariner AC Plug Holder Black". Accessed from https://www.promariner.com/en/51201f on Mar. 5, 2020.

\* cited by examiner

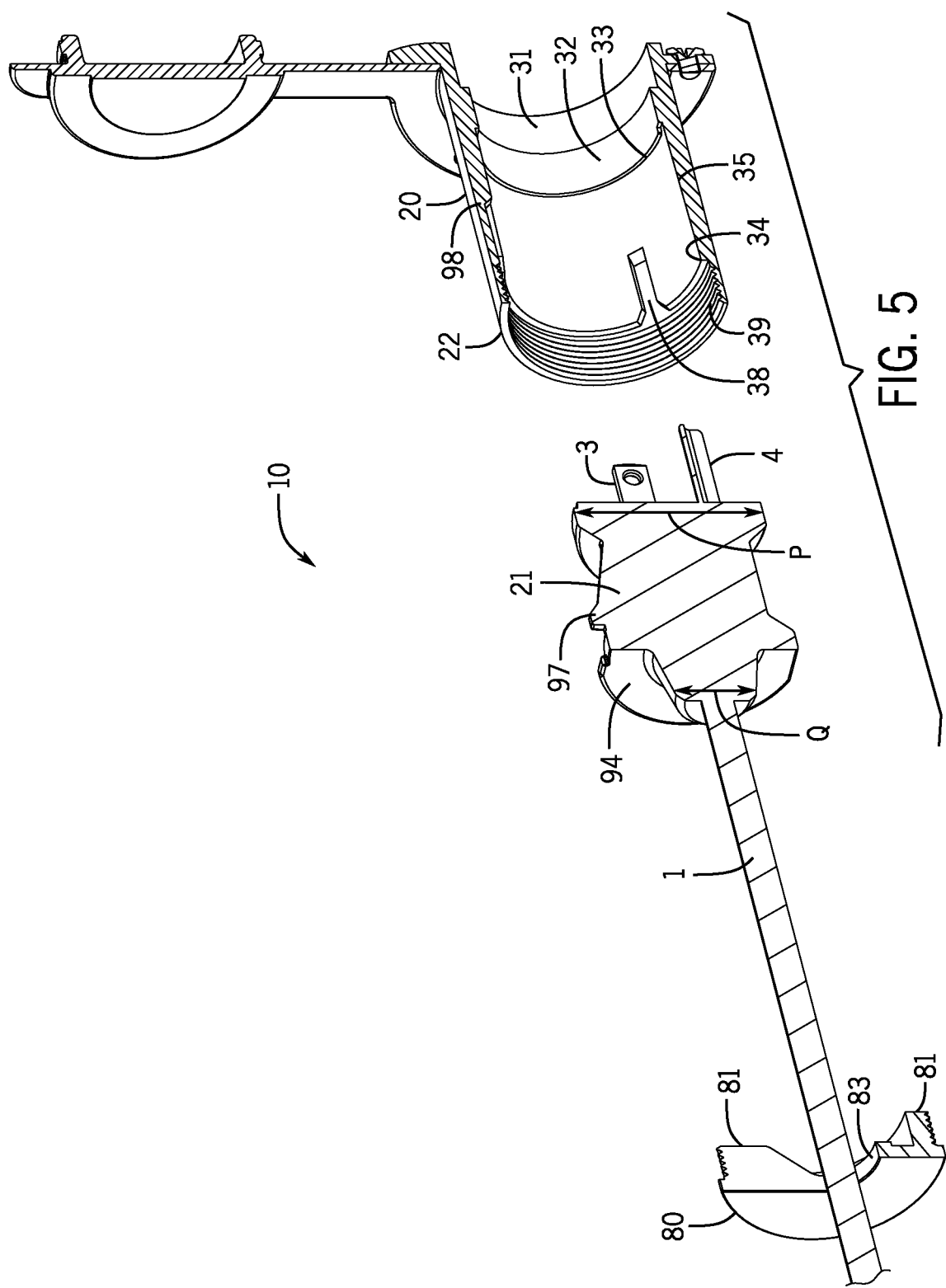

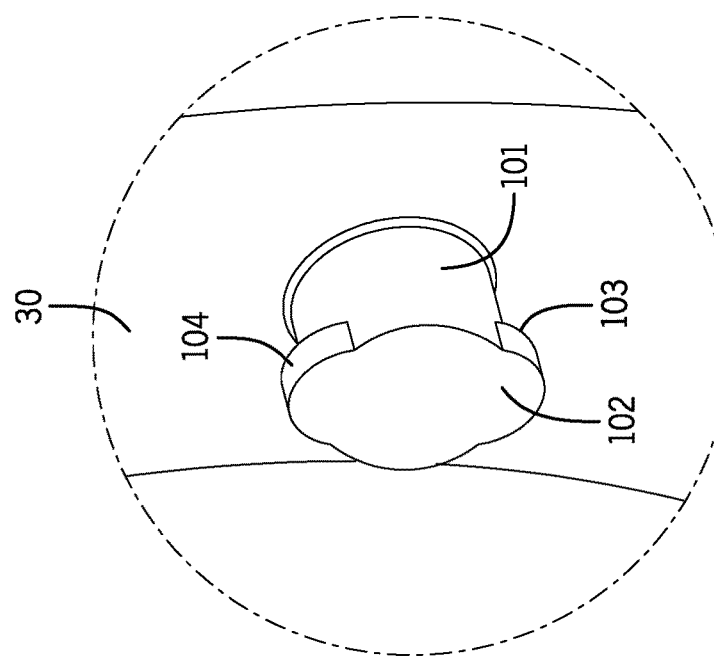
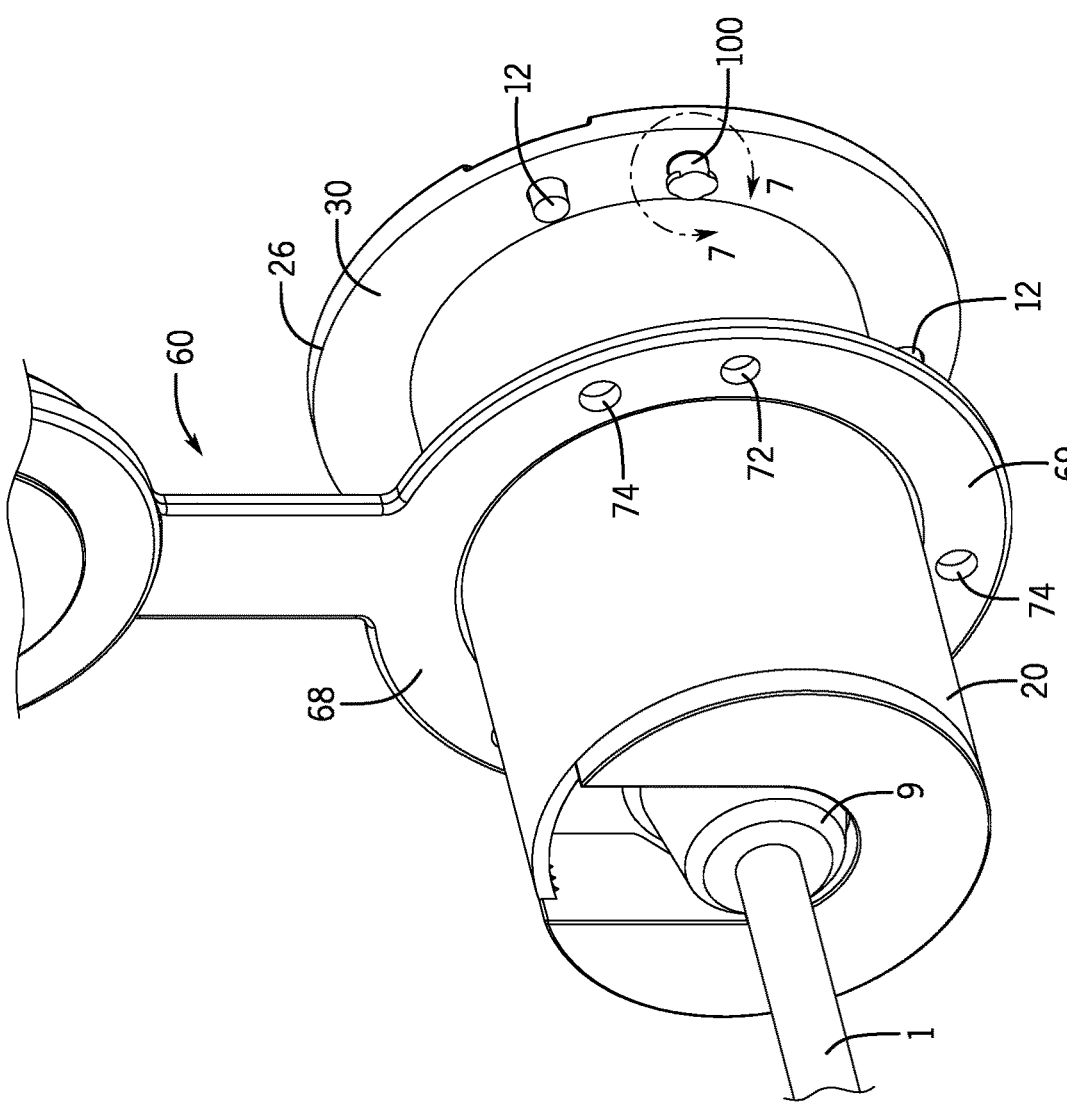

PLUG HOLDER FOR INSTALLING PLUG END

FIELD

The present application generally relates to systems and devices for installing plug ends on systems and vehicles, such as marine vessels, and more particularly to a plug holder for installing a plug end of a marine battery charger onto a surface of a system or vehicle, such as a vessel hull.

BACKGROUND

Marine vessels have electrical systems powered by one or more batteries storing electrical power on the boat. The batteries require charging and an on-board marine battery charging system is installed on many marine vessels. On-board marine battery chargers are configured to connect to shore power and facilitate charging the batteries thereby. The marine battery chargers have a cable with a male plug end configured to plug into a shore power outlet or an extension cord that connects to a shore power source. Similarly, many types of systems and vehicles incorporate a battery and on-board charging system that requires connection to a power outlet, the battery chargers having a cable with a male plug end configured to plug into the power outlet or an extension cord that connects to a power source.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a plug holder for installing a male plug end of a marine battery charger on a marine vessel includes an outer housing, a removable sleeve, and a backstop. The outer housing has a front end defining a plug opening and a back end defining a back opening, wherein the outer housing is attachable to a vessel hull and configured to hold a male plug end of the marine battery charger within the outer housing such that it is accessible through the plug opening. The removable sleeve fits within the outer housing and is shaped to secure the male plug end within the outer housing such that it does not move when connecting or disconnecting to the male plug end. The backstop is removably connectable to the back end of the outer housing to cover the back opening. The backstop is configured to retain the removable sleeve and the male plug end within the outer housing.

In another embodiment, a plug holder for installing a male plug end of a battery charger on a vehicle includes an outer housing having a front end defining a plug opening and a back end defining a back opening. The outer housing is attachable to a vessel hull and configured to hold a male plug end of a battery charger within the outer housing such that it is accessible through the plug opening. The removable sleeve fits within the outer housing and is shaped to secure the male plug end within the outer housing such that it does not move when connecting or disconnecting thereto. The removable sleeve is configured to receive the male plug end only in an upright orientation. At least one key element is provided on the removable sleeve that is configured to mate with a corresponding key element on an inner wall of the outer housing. The key element and the corresponding key element are configured to require that the removable sleeve can only be inserted into the outer housing in a predefined orientation that maintains the male plug end in the upright orientation. The backstop removably connects to the back end of the outer housing to cover the back opening. The backstop is configured to retain the removable sleeve and the male plug end within the outer housing.

Various other features, objects, and advantages of the invention will be made apparent from the following description taken together with the drawings.

BRIEF DESCRIPTION OF THE DRAWINGS

The present disclosure is described with reference to the following Figures.

FIG. 5 is a cross sectional view of an embodiment of the plug holder according to the present disclosure.

FIGS. 6A-6B depict another view of one embodiment of the plug holder according to the present disclosure.

DETAILED DESCRIPTION

Present inventors have recognized that current devices and systems for installing plug ends of battery chargers on marine vessels and other vehicle types are deficient and problematic. For example, available plug holders do not fixedly hold plug ends, such as a male plug end of a marine battery charger, and thus the plug end moves around and/or exits the plug holder when the user is connecting and disconnecting to the plug end. For example, many current plug holder designs do not have a mechanism that retains the plug end in the holder when a user disconnects from the plug end, such as disconnects a female extension cord end from the male plug end, and thus the male plug end pulls out of the plug holder during disconnection. This requires the user to engage in a multi-step process whereby the user pulls on the extension cord and pulls the male plug end of the cord out of the holder, and must disconnect the male and female plug ends using two hands. The user must then push the male plug end back into the plug holder. Other solutions have provided a plate or other element in front of the male plug end to retain it in the holder, which has the undesirable effect of shortening the pin length by placing a non-conductive part between the male and female plug ends. While the examples described herein are with respect to installation on a marine vessel, one of ordinary skill in the art will understand that the systems and devices described herein may be installed on any type of vehicle or vessel and that such embodiments are within the scope of the present disclosure.

The inventors have recognized additional problems with current plug holders, including that current plug holders do not accommodate multiple plug geometries of many different styles. Thus, the inventors endeavored to develop a universal AC plug holder for installing a plug end of a marine battery charger onto a marine vessel that could be used with any of multiple different plug geometries and that securely holds the plug end within the holder such that the plug end is held stable during connection and disconnection thereto.

Figure 1:
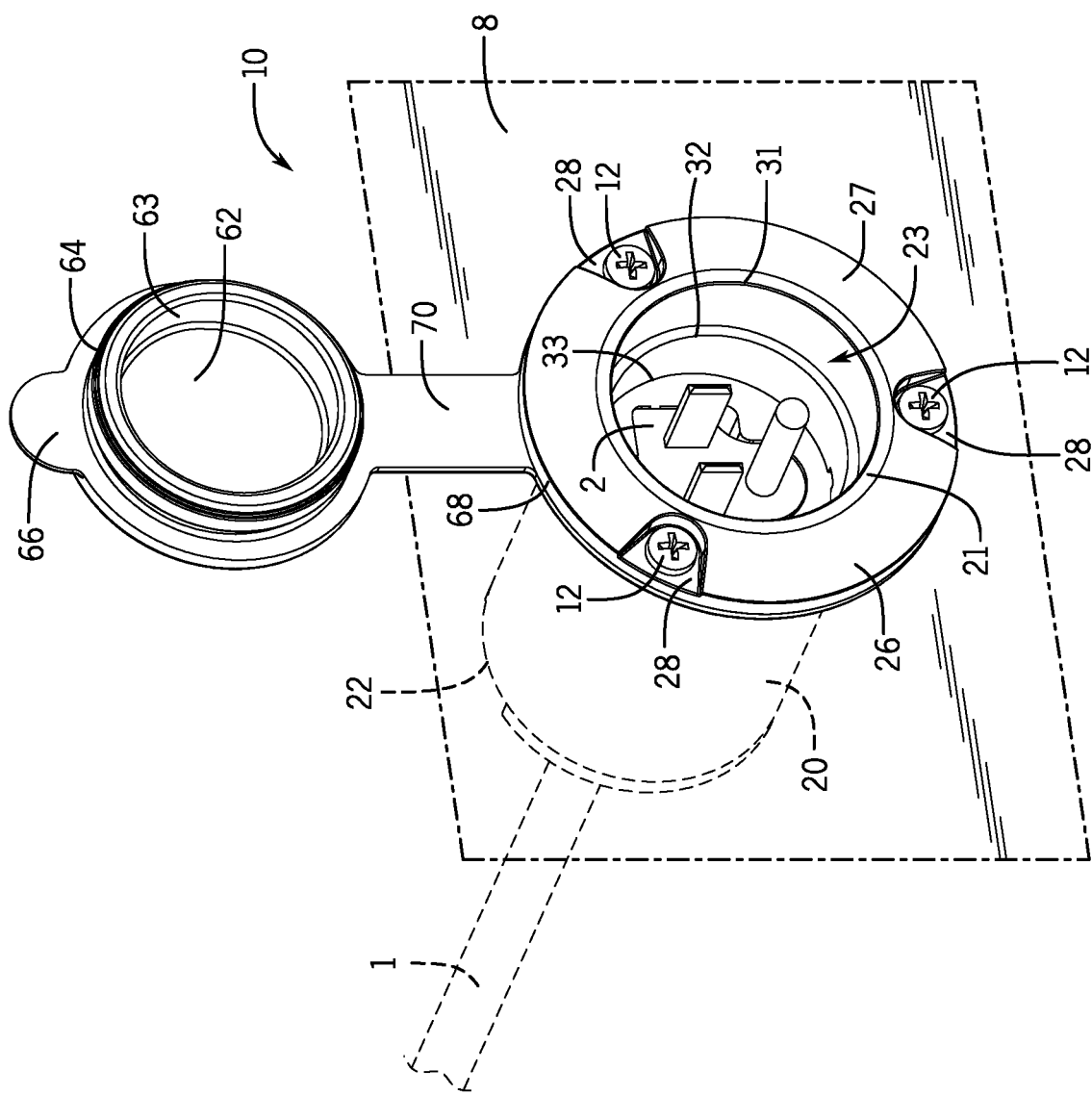
FIG. 1 depicts one embodiment of a plug holder installed to the surface of a vessel hull according to one embodiment of the present disclosure.

FIGS. 1-6 depict embodiments of plug holders according to the present disclosure. FIG. 1 depicts a plug holder 10 installed onto a surface 8 on a marine vessel. The plug holder 10 holds and installs a male plug end 2 of a marine battery charger onto the marine vessel such that a user can easily connect and disconnect to the male plug end 2 and the male plug end 2 will be held in place within the plug holder 10. The male plug end 2 is accessible through a plug opening 23. The plug holder 10 has an outer housing 20 that is fixedly connected to the flat surface 8 on the vessel by a number of screws 12. The screws 12 penetrate through a flange 26 of the outer housing 20. The flange 26 is configured with screw divots 28 on a front face 27 of the flange 26, which each accommodate a screw 12. In the depicted embodiment, three screws 12 are utilized to secure the plug holder 10 to the surface 8. In other embodiments, a lesser or greater number of screws may be utilized.

Figure 2:
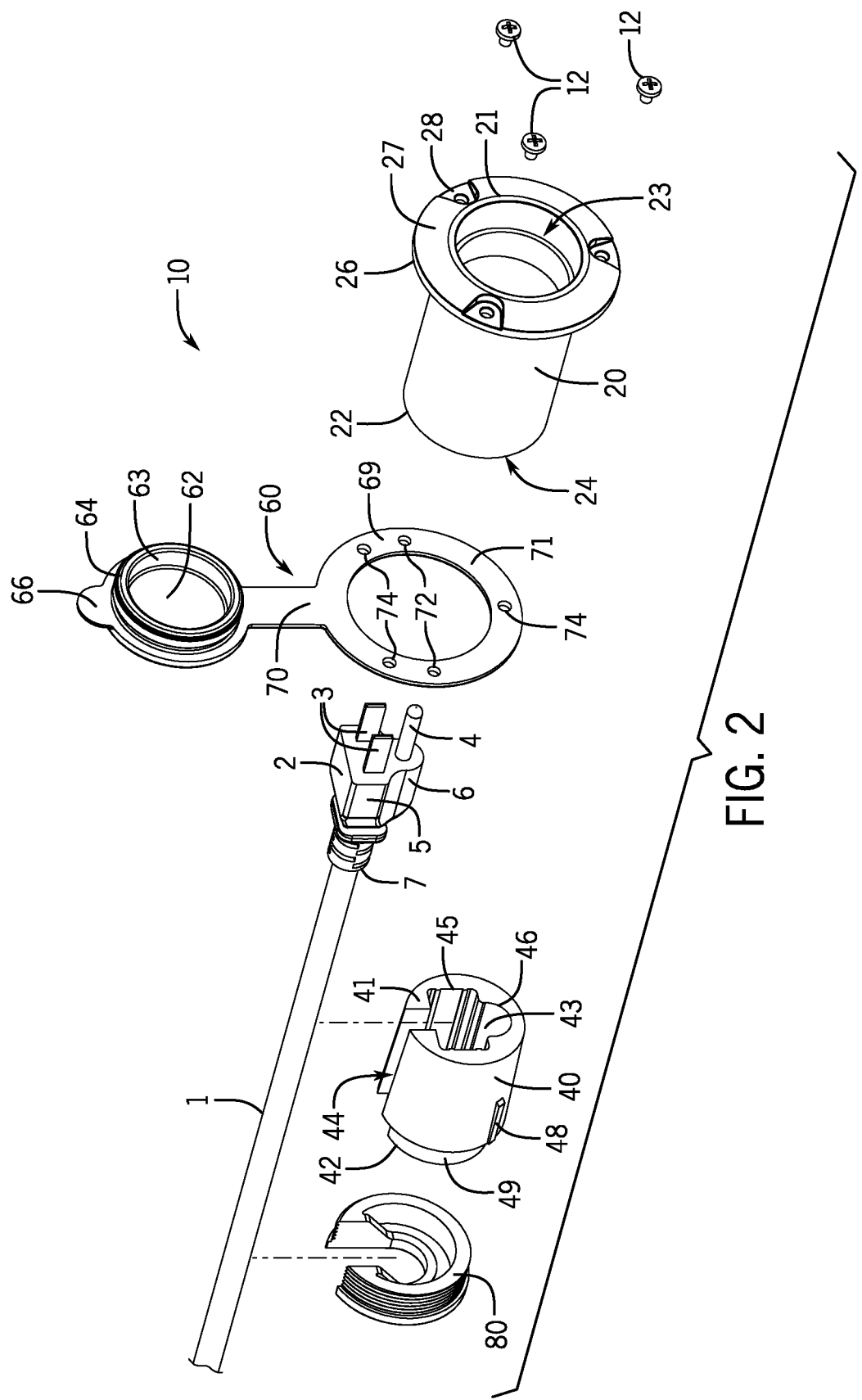
FIG. 2 is an exploded view of one embodiment of the plug holder.

Referring also to FIG. 2, the plug holder 10 has an elongated cylindrical body comprised of an outer housing 20 and a backstop 80. The flange 26 is connected to and extends from a front end 21 of the outer housing 20 and is configured to connect to the surface 8 of the marine vessel. In the depicted embodiment, a back face 30 (FIGS. 3A and 4) of the flange 26 opposes the surface 8 and the cylindrical outer housing 20 extends through a circular hole in the surface such that the plug holder 10 installs the male plug end 2 onto the surface 8 of the vessel hull, making the plug end easily accessible and protected from the harsh marine environment. The plug holder 10 includes a cover element 60 having a cover piece 62 that closes off and covers the plug opening 23. Specifically, the cover piece 62 has a connection edge 63 configured to connect with the front end 21 of the outer housing 20 so as to close off the plug opening 23 to protect the plug end 2. In the depicted embodiment, the connection edge 63 of the cover piece 62 includes ridges 64, such as comprised of a flexible plastic or rubbery material, configured to provide a friction fit with the first inner circumference 31 of the front end 21 of the outer housing 20. For example, the cover piece 62 may fit tightly to the housing 20 provide a waterproof or watertight seal with the front end 21 of the outer housing 20.

The cover element 60 includes a tab 66 configured to allow a user to grip the cover piece 62 in order to open and close the cover piece 62 over the plug opening 23. The cover element 60 further includes a tether 68 connecting the cover piece 62 to the rest of the plug holder 10. The tether 68 includes a flexible extender 70 that bends to allow the cover piece 62 to connect with the front end 21. The tether may be made from a specific durometer rubber material such that the tether forms a gasket between face 30 and the mounting surface 8. The tether 68 further includes a loop 69 that is configured to connect around the outer housing 20, wherein the extender 70 extends from the loop 69 and may form the sealing gasket required to keep water from getting inside the mounting surface 8. The loop 69 has an inner diameter that is configured to slide over the back end 22 and length of the outer housing 20. The tether 68 has a front face 71 that abuts the back face 30 of the flange 26 (see FIGS. 4 and 5). Thereby, the cover element 60 is fixedly mounted between the flange 26 and the surface 8 on the marine vessel.

The plug holder 10 generally includes the outer housing 20, a removable sleeve 40 configured to fit within the outer housing 20, and a backstop 80 removably connectable to the back end 22 of the outer housing 20 and configured to retain the removable sleeve 40 within the outer housing 20. Certain embodiments of the plug holder 10 may also include the cover element 60 as shown and described herein. The removable sleeve 40 is shaped to secure the plug end 2 within the outer housing 20. The plug end 2 may be a male plug end having hot and neutral prongs 3 and a ground post 4, as may be provided in any of the various standard plug arrangements. The plug end 2 has a molded plastic head having a substantially flat top side and two substantially flat sides 5 extending perpendicular from the top side. While plug heads may take on various shapes, the shape depicted in FIG. 2 depicts a typical male plug head configuration. The plug head has a rounded bottom 6 that holds and accommodates the ground post 4.

It is standard that plug heads be maintained in an upright orientation, which is the orientation shown in FIGS. 1 and 2. The inventors have recognized that the upright orientation is highly preferred by users. Additionally, the inventors have recognized that current plug holders permit installation of plug heads in various positions, such as sideways or upside down, which is undesirable to the user. Accordingly, the inventors developed the plug holder disclosed herein which has features that prevent the installation of the plug end in an incorrect orientation where the plug end is not in the standard upright orientation. The plug holder 10 is configured to require and maintain the plug end 2 in the upright orientation where the prongs 3 are positioned horizontally with respect to one another and above the ground post 4, which is orientated at the 6 o'clock position. Assuring correct upward orientation of the cover provides an additional benefit of protecting the mounting surface. Where the cover opens upwards against gravity such that when it is released it falls down partially covering plug connection or the hole 23 to prevent or reduce downward rain entry into the mounting surface 8 through the plug opening 23.

The removable sleeve 40 is an elongated c-shaped element with an opening 44 at a top side thereof. The opening 44 is sized to allow the removable sleeve 40 to slide onto and over the cord 1 such that it can then be slid over the male plug end 2. In one embodiment, the opening 44 has a width between 23.5 mm to 24.5 mm. The removable sleeve 40 is shaped to fit snuggly around the plug end 2 so as to hold it in place within the outer housing 20. The removable sleeve 40 wraps around the male plug end 2. The c-shaped removable sleeve 40 has a front end 41 and a back end 42 and a cavity 43 shaped to receive the plug end 2. The removable sleeve 40 is configured to slide into the outer housing 20, wherein the front end 41 slides through the back opening 24 at the back end 22 of the outer housing 20, and toward the front end 21 of the outer housing 20. Prior to sliding the removable sleeve 40 into the outer housing 20, the removable sleeve 40 is slid onto the plug end 2, and the assembled pair is inserted into the outer housing 20. The cavity 43 has a bottom edge 46 configured to accommodate the bottom 6 of the plug end 2.

Figure 3A:
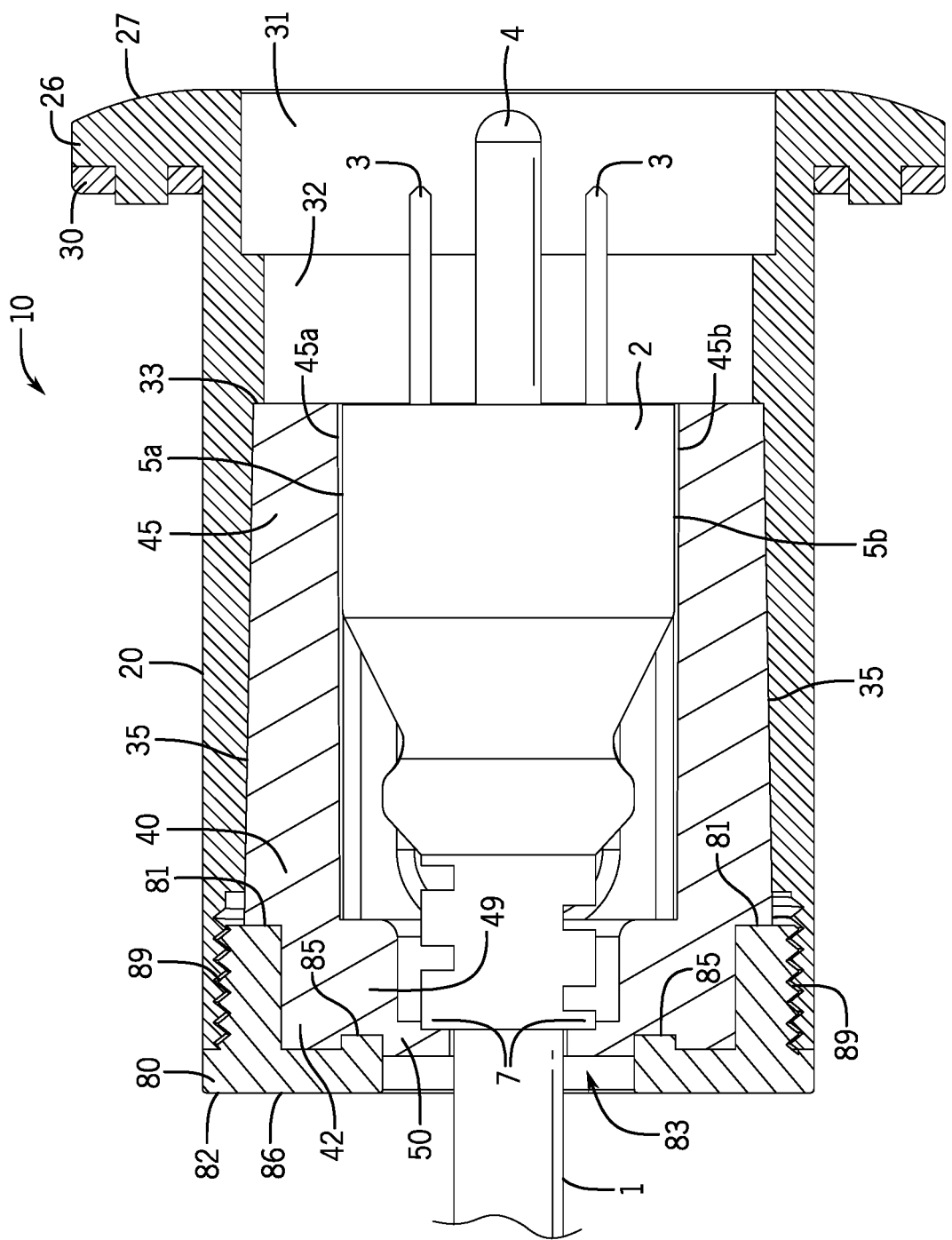
FIGS. 3A-3B depict a cross-sectional view of one embodiment of the plug holder.

The c-shaped removable sleeve 40 is compressible in order to pinch the sides of the male plug end and provide strong frictional engagement with the plug end 2 and maintain it in place when connecting or disconnecting thereto. As best shown in FIG. 3A, the outer housing 20 has tapered inner walls 35 that are configured to compress the c-shaped removable sleeve 40 as the removable sleeve 40 slides toward the front end 21 of the outer housing 20. The compression on the removable sleeve 40 causes the removable sleeve to pinch the plug end 2, and particularly compresses the side edges 45a and 45b against the sides 5a and 5b, respectively, of the plug end 2. This frictional engagement prevents the plug end 2 from being pulled outward out of the removable sleeve 40 and/or the outer housing 20 when a female end is disconnected from the male plug end 2.

Figure 4:
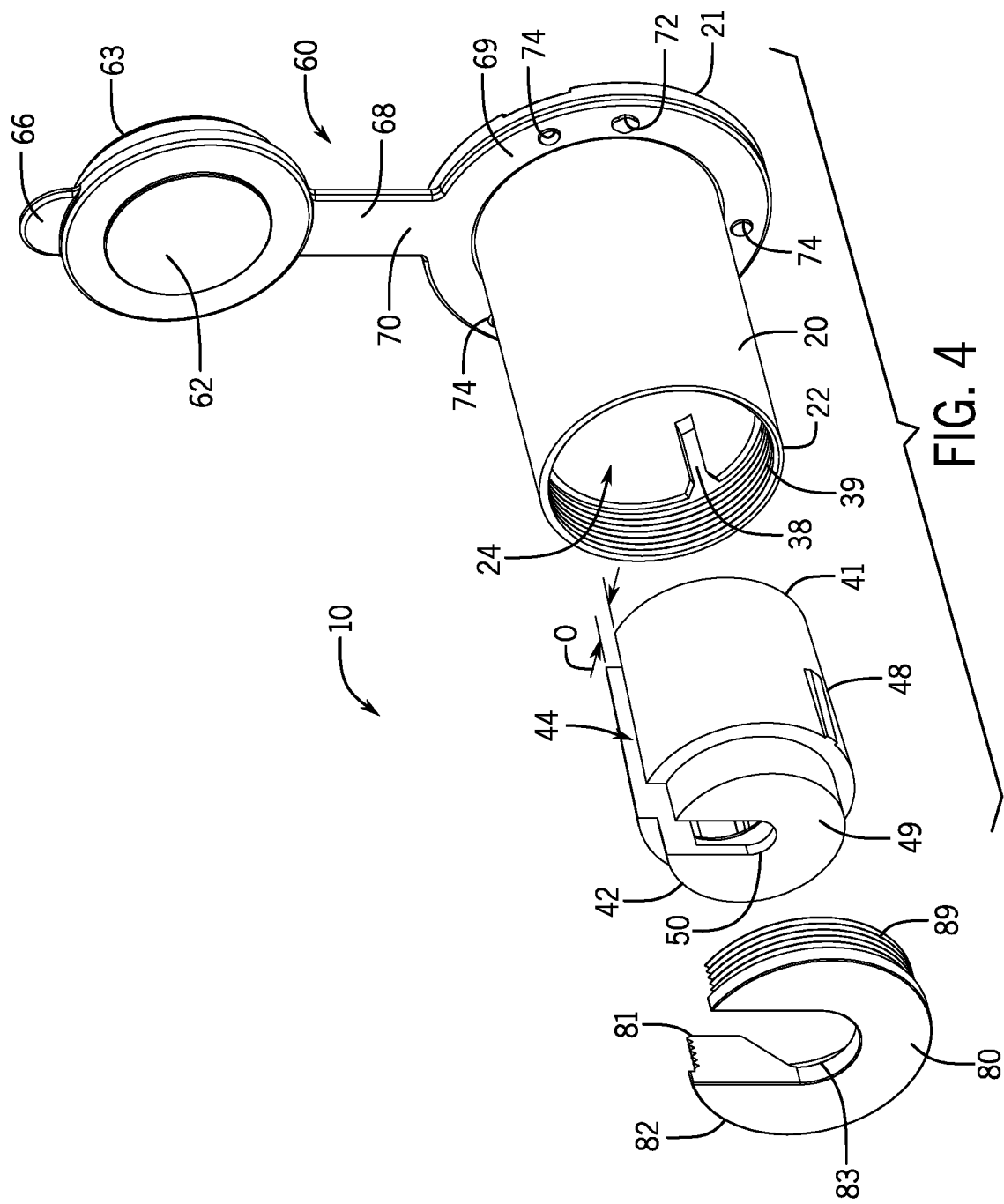
FIG. 4 is an exploded view of one embodiment of the plug holder according to the present disclosure.

Referring also to FIG. 4, the removable sleeve 40 has a collar 49 at the back end 42 that is configured to engage a back lip 7 of the plug end 2 and to prevent the plug end 2 from moving backward within the removable sleeve 40 and/or the outer housing 20 when connecting a female plug end thereto. Specifically, a back lip 50 of the collar 49 engages the back lip 7 of the plug end 2 to resist backward force imposed upon the plug end 2, such as during connection, and generally to maintain the plug end 2 tightly within the plug holder 10.

The plug holder 10 includes a backstop 80 removably connectable to the back end 22 of the outer housing 20 to cover the back opening 24 thereof. The backstop 80 has a front end 81 and a back end 82, where the front end 81 slides into the back end 22 of the outer housing 20. The back end 82 of the backstop 80 has a back face 86 that forms an outer backside of the plug holder 10 and a front face 85 that engages the back end 42 of the sleeve 40. Thereby, the backstop 80 is configured to tightly hold the removable sleeve 40 within the outer housing 20. Any backward force on the removable sleeve 40 may be transferred to the backstop 80, which is secured to the back end 22 of the outer housing 20. In the depicted example, the backstop 80 is secured to the outer housing 20 via threaded engagement between the threads 89 on the backstop and threads 39 on the outer housing 20. Thus, attachment of the backstop 80 includes screwing the backstop onto the back end 22 of the outer housing 20.

As described above, the removable sleeve 40 is configured to receive the plug end 2 only in an upright orientation, and the plug holder 10 is generally configured to only enable installation of the plug end in the upright orientation. To that end, the removable sleeve 40 has a key element configured to mate with a corresponding key element on an inner wall of the outer housing 20. The key element and the corresponding key element are configured to require that the removable sleeve can only be inserted in to the outer housing in a predefined orientation that maintains the male plug end in an upright orientation. Various key elements may be utilized for such purpose, which are elements configured to mateably connect and have complementary shapes, and otherwise prevent the removable sleeve 40 from being installed into the outer housing 20 in an incorrect orientation. As best seen in FIG. 4, the key element on the removable sleeve 40 may be a ridge 48, such as a ridge 48 toward the backend 52 of the removable sleeve 40, but ahead of the narrowed collar portion 49. The corresponding key element on the outer housing 20 is a groove 38 on the inner wall thereof. As also seen in FIG. 5, the groove 38 is sized to accommodate the ridge 48, such as having a length and a width that complement and receive the ridge 48. In the depicted embodiment, the removable sleeve 40 has two key elements, including two ridges 48, each received at a corresponding groove 38 on the tapered inner wall 35. In other embodiments various key element configurations may be utilized.

The backstop 80 has an opening 83 that permits the cord 1 to extend out of the backside of the plug holder 10, but prevents the plug end 2 from exiting, such as due to backward force thereon. In one embodiment, the plug holder 10 is configured such that the removable sleeve 40 can be removed such that the outer housing 20 and backstop 80, alone, can maintain a plug end 2 therein, which may be maintained loosely depending on the configuration of the plug end. FIG. 5 depicts one embodiment where a large plug end 2' is being inserted into the outer housing 20.

FIG. 5 depicts a cross-sectional view of the plug end 2' and plug holder 10. The particular plug end 2' is a proprietary plug end 2' which is a Guest Connect™ provided with the Guest Connect Battery Charger by Power Products of Menomonee Falls, Wis. The Guest Connect plug end 2' is oversized compared to most standard plug ends, and in one embodiment the outer housing 20 may be specifically configured to receive that plug end when the removable sleeve 40 is removed. Specifically, the third inner circumference 33 is configured to accommodate the diameter P of the plug end 2' and the interior length B (see FIG. 3B) is configured to accommodate the length of the Guest Connect plug end 2'. The plug holder 10 is configured such that the backstop 80 fits against a back edge 94 of the plug end 2' and the opening 83 in the backstop is configured to accommodate the diameter Q of the plug end 2'. Specifically, the front end 81 of the backstop 80 opposes the back edge 94 of the plug end 2' when the backstop 80 is screwed into the outer housing 20. Thereby the plug end 2' is maintained snugly within the plug holder 10. To provide just one exemplary embodiment, length B may be in the range of about 44.86 mm to about 45.06 mm and the diameter G may be in the range of about 36.97 to about 37.17 mm.

In certain embodiments, the plug end 2' and the outer housing 20 may include key elements configured to require that the plug end 2' be inserted in an upright orientation and to maintain the plug end 2' in that upright orientation. In the depicted example, the plug end 2 has a tab 97 extending outward therefrom. The outer housing 20 has a groove 98 that receives the tab 97. Thus, the plug end 2' can only be inserted in the orientation in which the tab 97 slides into the groove 98, which is the upright orientation.

Figure 3B:
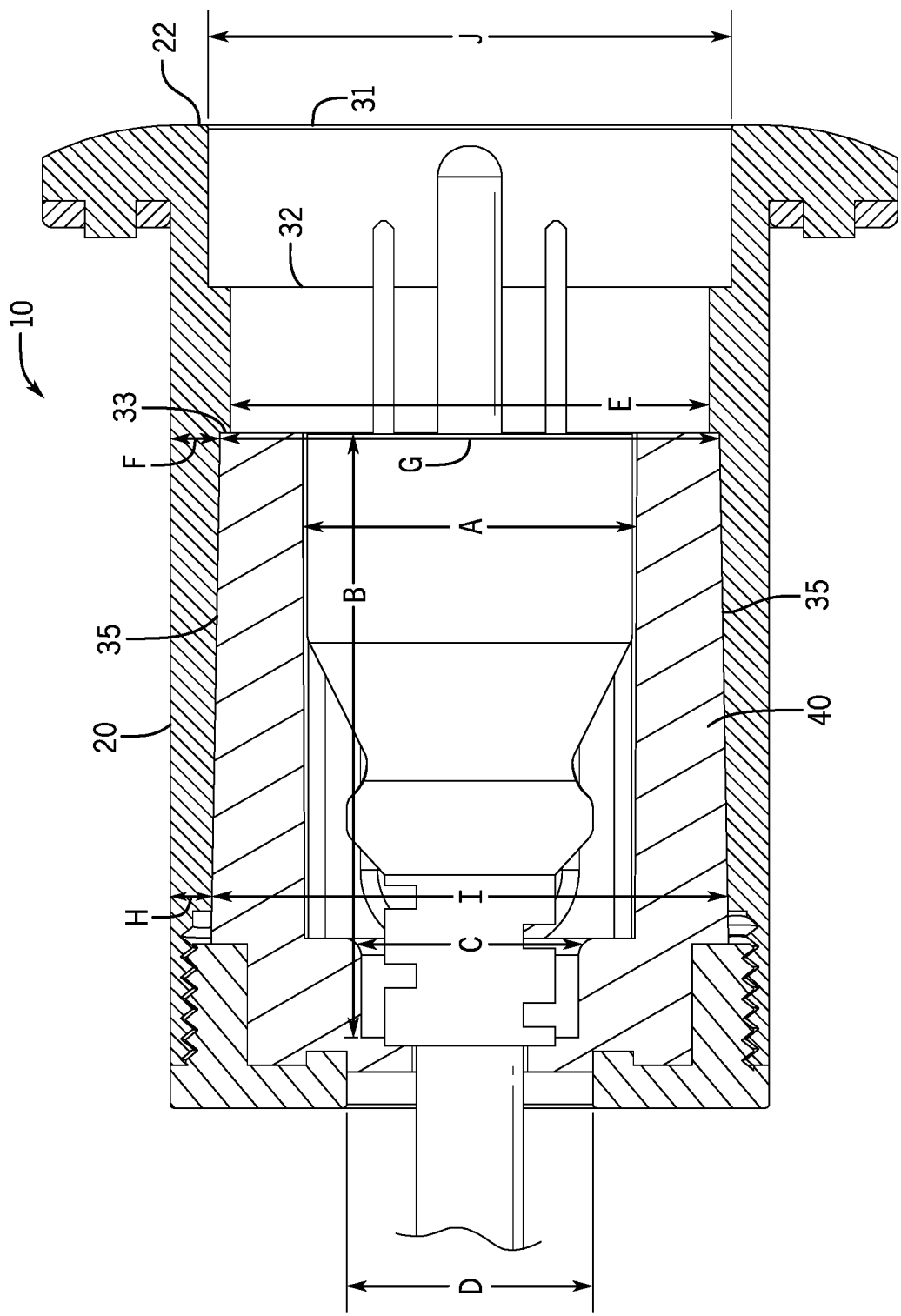

The outer housing 20 is sized to contain the entire plug end, including the prongs 3 and ground post 4 within the housing cavity. FIG. 3B depicts an exemplary embodiment and exemplary dimensions are provided in order to further demonstrate the specific embodiment. However, a person having ordinary skill in the art will understand in view of the disclosure that various dimensions may be provided to accommodate different plug ends 2. In the example, the outer housing 20 has graduated circumferences 31-33 toward the front end which accommodate various aspects. The first inner circumference 31 accommodates and forms the plug opening 23 which has a diameter J, which in one embodiment is in the range of 38.75 mm to 38.95 mm. At the opposite side of the second inner circumference 32, a stop for the removable sleeve 40 is provided. In one embodiment, the second circumference 32 has a diameter E in the range of 35.45 mm to 35.65 mm. A third inner circumference 33 is sized to accommodate a front end 41 of the removable sleeve 40. In one embodiment, the third circumference 33 has a diameter G in the range of 36.97 mm to 37.17 mm.

As described above, the outer housing 20 has a tapered inner wall 35 configured to accommodate and compress the removable sleeve 40. The tapered inner wall 35 narrows from an initial diameter I in the range of 38.21 mm to 38.41 mm, to the narrower diameter G described above. At the back end, the tapered inner wall 35 of the outer housing has a thickness H in the range of 2.96 mm to 3.16 mm, and at the front end has a thickness F in the range of 3.58 mm to 3.78 mm. The inner diameter C of the collar 49 is in the range of 16.53 mm to 16.73 mm. The inner diameter D of the opening 83 in the backstop 80 is in the range of 18.19 mm to 18.39 mm.

In certain embodiments, key elements may be provided on the cover element 60, such as on the tether 68 in order to fasten the cover element 60 to the outer housing 20. In the embodiment at FIGS. 6A-6B, the loop 69 of the tether 68 has key elements configured to mate with a corresponding key element on the back face 30 of the flange 26. In the depicted embodiment, a t-piece 100 shown in detail in FIG. 6B extends out from a back face 30 of the flange 26. A corresponding hole 72 is provided in the loop portion 69 of the tether 68 which is configured to fit over the t-piece 100. The t-piece 100 includes a post 101 and a top 102. The hole 72 is configured to be pressed over the top 102 such that the tether is retained between the back face 30 of the flange and the front face 103 of the top element 102. In certain embodiments, the t-piece 100 may include one or more flanges 104 that extend longer than the diameter of the corresponding hole 72 to press against the tether 68 in order to retain it in place. The tether also provides a waterproof seal between the plug holder face 26 and the mounting surface 8 via its elastomeric qualities. The tether also includes screw holes 74 which align with the screw holes in the flange 26 and enable the screws 12 to easily penetrate through the tether 68 and fasten the entire system to the surface 8 of the vessel.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A plug holder for installing a male plug end of a marine battery charger on a marine vessel, the plug holder comprising:
    an outer housing having a front end defining a plug opening and a back end defining a back opening, wherein the outer housing is attachable to a vessel hull and configured to hold a male plug end of a marine battery charger within the outer housing such that it is accessible through the plug opening;
    a removable sleeve that fits within the outer housing and is shaped to secure the male plug end within the outer housing such that it does not move when connecting or disconnecting to the male plug end; and
    a back stop removably connectable to the back end of the outer housing to cover the back opening, wherein the back stop is configured to retain the removable sleeve and the male plug end within the outer housing.

2. The plug holder of claim 1, further comprising a flange on the front end of the outer housing, wherein the flange is configured to be connected to a surface of the vessel hull; and
    wherein a back face of the flange is configured to oppose the surface of the vessel hull, and wherein the outer housing is cylindrical and is configured to extend through a circular hole in the surface such that the male plug end is installed onto the surface of the vessel hull.

3. The plug holder of claim 1, wherein the removable sleeve is configured to receive the male plug end only in an upright orientation.

4. The plug holder of claim 3, wherein the removable sleeve is configured to pinch sides of the male plug end so as to resist movement of the male plug end when connecting or disconnecting thereto.

5. The plug holder of claim 4, wherein the removable sleeve is c-shaped and wraps around the male plug end with an opening on a top side, wherein the outer housing has tapered inner walls such that the outer housing compresses the c-shaped removable sleeve causing it to pinch the sides of the plug.

6. The plug holder of claim 5, wherein the opening on the top side of the removable sleeve is sized to allow the removable sleeve to slide onto a cord.

7. The plug holder of claim 1, further comprising at least one key element on the removable sleeve configured to mate with a corresponding key element on an inner wall of the outer housing, wherein the key element and the corresponding key element are configured to require that the removable sleeve can only be inserted into the outer housing in a predefined orientation that maintains the male plug end in an upright orientation.

8. The plug holder of claim 7, wherein the key element on the removable sleeve is a ridge on an exterior of the removable sleeve and wherein the corresponding key element is a groove on the inner wall of the outer housing.

9. The plug holder of claim 1, wherein the outer housing and the back stop are configured such that the male plug end can be maintained loosely within the outer housing without the removable sleeve.

10. The plug holder of claim 1, further comprising a cover element having a cover piece removably attachable to the front end of the outer housing so as to cover the plug opening and a tether configured to attach to the outer housing so as to connect the cover piece to the outer housing.

11. The plug holder of claim 10, further comprising at least one key element on the tether configured to mate with a corresponding key element on the outer housing so as to connect the cover element to the outer housing in a predefined orientation.

12. The plug holder of claim 11, wherein the corresponding key element on the outer housing is a t-piece extending from the outer housing and the key element on the tether is a hole therethrough configured to fit over the t-piece.

13. The plug holder of claim 12, wherein the t-piece is on a back face of a flange of the outer housing that surrounds the plug opening, and wherein the tether is configured to be positioned between the back face of the flange and a surface of the vessel hull so as to provide a waterproof seal therebetween.

14. The plug holder of claim 13, further comprising at least two t-pieces on the back face of the flange of the outer housing and a corresponding hole through the tether for each t-piece.

15. A plug holder for installing a male plug end of a battery charger on a vehicle, the plug holder comprising:
    an outer housing having a front end defining a plug opening and a back end defining a back opening, wherein the outer housing is attachable to a vessel hull and configured to hold a male plug end of a battery charger within the outer housing such that it is accessible through the plug opening;
    a removable sleeve that fits within the outer housing and is shaped to secure the male plug end within the outer housing such that it does not move when connecting or disconnecting to the male plug end, wherein the removable sleeve is configured to receive the male plug end only in an upright orientation;

at least one key element on the removable sleeve configured to mate with a corresponding key element on an inner wall of the outer housing, wherein the key element and the corresponding key element are configured to require that the removable sleeve can only be inserted into the outer housing in a predefined orientation that maintains the male plug end in the upright orientation;

a back stop removably connectable to the back end of the outer housing to cover the back opening, wherein the back stop is configured to retain the removable sleeve and the male plug end within the outer housing;

wherein the outer housing and the back stop are also configured such that the male plug end can be maintained loosely within the outer housing without the removable sleeve.

16. The plug holder of claim 15, wherein the key element on the removable sleeve is a ridge on an exterior of the removable sleeve and wherein the corresponding key element is a groove on the inner wall of the outer housing.

17. The plug holder of claim 16, wherein the corresponding key element on the outer housing is a t-piece extending from the outer housing and the key element on the tether is a hole therethrough configured to fit over the t-piece.

18. The plug holder of claim 15, wherein the removable sleeve is c-shaped and wraps around the male plug end with an opening on a top side, wherein the outer housing has tapered inner walls such that the outer housing compresses the c-shaped removable sleeve causing it to pinch the sides of the male plug end, and wherein the opening on the top side of the removable sleeve is sized to allow the removable sleeve to slide onto a cord.

19. The plug holder of claim 1, wherein the removable sleeve is configured to slide into the back opening of the outer housing, and wherein the outer housing has tapered inner walls configured to compress the removable sleeve as it slides toward the front end of the outer housing to prevent the removable sleeve and the plug end from being pulled out of the plug opening.

20. The plug holder of claim 15, wherein the removable sleeve is configured to slide into the back opening of the outer housing, and wherein the outer housing has tapered inner walls configured to compress the removable sleeve as it slides toward the front end of the outer housing to prevent the removable sleeve and the plug end from being pulled out of the plug opening.

* * * * *